United States Patent [19]

Helmstetter

[11] Patent Number: 5,453,119
[45] Date of Patent: Sep. 26, 1995

[54] FIREPROOFING OF WOOD, CELLULOSIC, AND FABRIC CONTAINING PRODUCTS

[75] Inventor: Jack G. Helmstetter, Brick, N.J.

[73] Assignee: Loc Systems, Ltd. (L.P.), Lavalette, N.J.

[21] Appl. No.: 221,933

[22] Filed: Apr. 1, 1994

[51] Int. Cl.$^6$ .................................................. C09K 21/02
[52] U.S. Cl. ..................... 106/18.12; 106/600; 252/601; 252/607
[58] Field of Search .................... 106/18.12, 600; 252/601, 607; 428/921

[56] References Cited

U.S. PATENT DOCUMENTS

| | | | |
|---|---|---|---|
| 3,533,816 | 10/1970 | Oken | 106/600 |
| 4,341,559 | 7/1982 | Friedemann et al. | 106/600 |
| 4,466,831 | 8/1984 | Murphey | 106/600 |
| 4,479,824 | 10/1984 | Schutt | 106/600 |
| 4,886,548 | 12/1989 | Helmstetter | 106/18.12 |
| 4,888,057 | 12/1989 | Nguyen et al. | 106/600 |
| 5,035,951 | 7/1991 | Dimanshteyn | 106/18.12 |
| 5,085,897 | 2/1992 | Luckanuck | 106/600 |

*Primary Examiner*—Anthony Green
*Attorney, Agent, or Firm*—Stephen W. White

[57] ABSTRACT

A novel solution for adding fire resistance to finely divided wood, cellulosic and fabric containing materials is described. This solution is a particular mixture of silicates of varying viscosity and may be added, in a novel process, to the finely divided wood, cellulosic and fabric containing materials during the manufacture thereof. This is a highly utile method for adding fire resistance and other factors to this material. The finely divided materials may be made from any conventional sources and include waste products. Thus, the products made from combining the solution of this invention with the finely divided materials have high value in use since recycled ingredients are involved. Products made from these mixtures and the finely divided materials include building materials such as panels and tiles as well as insulation materials which can replace the more hazardous fiber glasses.

7 Claims, No Drawings

FIREPROOFING OF WOOD, CELLULOSIC, AND FABRIC CONTAINING PRODUCTS

BACKGROUND OF THE INVENTION

1. Field of the Invention

This invention relates to the field of wood, other cellulosic products and waste fabrics and the like and to fire-retardant materials which are added thereto. Still more particularly, this invention relates to a novel mix of ingredients that can be mixed with various wood, cellulosic and fabric materials during the manufacture of products therefrom in order to impart a high degree of fireproofing and stability thereto. Still more particularly, this invention relates to a novel process for the mixing of fireproofing ingredients to various wood, other cellulosic materials and fabrics during the manufacture of products therefrom.

2. Discussing of the Prior Art

There is a continuing and pressing need within the prior art to add a degree of fire suppression to flammable building materials such as wood, paper, other cellulosic products as well as fabrics. There is also a pressing need within the prior art to provide fire proof building materials and to achieve materials that are also stable, resistant to rot and decay and are environmentally safe to use by both the builder and the consumer thereof. These products include those made from waste wood and other cellulosic products and waste products such as fabrics that are mixed with other materials in order to form a sheet, tile, insulation or other building product. In fact, within some areas of the United States, building regulation codes require that most of the materials of construction have such fire retardancy. There is also a pressing need within the building industry to use waste wood and paper products in order to conserve valuable wood reserves. It is also desired to utilize waste fabric materials such as carpets and the like in order to save on the disposal problems associated therewith. Additionally, since it has not been determined that insulation materials made from fiberglass and the like are not harmful to humans when handled, there is a pressing need to find a suitable replacement therefor.

There are a host of ingredients that are used to impart some degree of fireproofing to some flammable materials. Many of these prior art ingredients are usually applied to these products as a solution of some sort after the construction thereof. Most of these ingredients do nothing more than impart a slight resistance to fire and hence are not widely used by the prior art.

In a previous patent issued to the same assignee (U.S. Pat. No. 4,886,548, Dec. 12, 1989) there is described a mixture of silicates and other additives that can be applied as a solution to various building materials in order to improve their resistance to fire. The materials of this patent show great promise as a fire retardant when applied as taught therein. The formulation is, however, somewhat complex and costly to apply and there is a continuing and wide-spread need to improve on the teachings of this patent. Additionally, since the formulations detailed within the scope of that invention required application to the building material after the construction thereof, there is a need to find a formula that can be applied within the construction of the building material itself, e.g. when a tile, panel or insulating bat is formed therefrom. With such a process, it will be possible to coat all of the ingredients of this material and not just the surface. Hence, it should result in a product that is more resistant to fire and is more stable and environmentally safe.

SUMMARY OF THE INVENTION

It is an object of this invention to provide ingredients suitable for mixing with raw, building materials prior to the construction of products therefrom and to provide suitable fire retardancy thereto. It is a further object of this invention to provide a novel process for the application of fireproofing ingredients to finely divided wood, cellulosic and fabric materials in order to provide a fire resistant building insulation substance. These and yet other objects are achieved in a solution suitable for providing fire retardancy to finely divided wood, cellulosic and fabric containing materials when added thereto said solution comprising a mixture of silicates and water, wherein said mixture comprises two silicates having a composition of from about 80% to about 99.9% by weight of a silicate comprising 14.70% $Na_2O$ and 29.40% $SiO_2$, being about 44.10% solids and a viscosity of 400 Centipoises at 68° F. and from about 20% to about 0.10% of a silicate comprising 8.90% $Na_2O$ and 28.70% $SiO_2$, being about 37.6% solids and a viscosity of 180 Centipoises at 68° F.

In yet another embodiment, this invention relates to a process for the use of the mixture of this invention to impart fire retardancy to wood, cellulosic and fabric containing materials comprising the steps of preparing a mixture comprising:

a) from about 80% to about 99.9% by weight of a silicate comprising 14.70% $Na_2O$ and 29.40% $SiO_2$, being about 44.10% solids and a viscosity of 400 Centipoises at 68° F. and from about 20% to about 0.10% of a silicate comprising 8.90% $Na_2O$ and 28.70% $SiO_2$, being about 37.6% solids and a viscosity of 180 Centipoises at 68° F.;

b) further diluting the mixture from a), above, to about 10 to 30% solids;

c) adding about 0.25% to about 3.0% of an alkali carbonate to b);

d) adding this mixture to wood, cellulosic and fabric containing materials prior to grinding these materials into a finely divided state.

DETAILS OF THE INVENTION

The use of silicates to impart fire retardency is well-known in the prior art. The use of other salts and acids (e.g. boron salts and sulfuric acid, for example) to give similar results is also known. However, many of these prior art systems are applied to the surface of the materials and thus do not impart sufficient fire proofing. Additionally, most of the prior art surface coatings are not known to adhere well during application, with the exception of that described in the previously mentioned patent (U.S. Pat. No. 4,886,548). There is still this need to have a system that can be mixed with wood products, cellulosic and fabric materials during the manufacture of building materials therefrom. In this invention, I have discovered just such a system. By combining certain silicates in exact proportions I am able to mix this substance in with the cellulosic materials and provide superior fire retardency thereto.

By wood, I mean materials such as wood fibers, branches, leaves, stumps or chips as well as waste wood products and even virgin woods. By cellulosic and fabric containing materials I mean materials such as paper fibers including waste paper; cotton and other fibers including waste fibers from discarded or surplus clothing, carpet remnants and the like. These materials may be used in the fabrication of building materials such as panels, siding, roofing, insulation, ceiling tile and the like. In the manufacture of these building products it is conventional to either chip or grind the raw material into a finely divided state and then to add other products to enhance the quality of the final product. For example, glues and resins may be added to improve the adhesion of the finely divided material into a solid state. Also, prior art substances such as stabilizers and the like may be added to improve the stability of the end product and to lengthen the life thereof. The addition of fire retardants is difficult at this stage due to the interference of the conventional systems with the fabrication of the building material itself.

What I have discovered is that when I combine from about 80% to about 99.1% by weight of a silicate comprising 14.70% $Na_2O$ and 29.40% $SiO_2$, being about 44.10% solids and a viscosity of 400 Centipoises at 68° F. and from about 20% to about 0.10% of a silicate comprising 8.90% $Na_2O$ and 28.70% $SiO_2$, being about 37.6% solids and a viscosity of 180 Centipoises at 68° F., it is possible to mix this material with the aforementioned wood, cellulosic and fabric containing substances in order to provide and impart fire resistance thereto. Also, by adding this specific mixture in the ranges given above, not only is the resulting product highly resistant to fire but the stability of the product also increases. By stability, I mean that its resistance to decay is improved. Also, less fibrous particles remain improving the handling thereof. This is an important discovery since most fibrous materials retain some of the fibrous particles after manufacture and thus present a hazard to those in the construction industry.

The silicates of this invention are made by combining various percentages of sodium oxide and silica dioxide. For example, one of the silicates used within the ambit of this invention contains 80% to about 99.1% by weight of a silicate comprising 14.70% $Na_2O$ and 29.40% $SiO_2$, being about 44.10% solids and a viscosity of 400 Centipoises at 68° F. This material represents a weight ratio of $SiO_2$ to $Na_2O$ of 2.00 and can be easily manufactured as is well-known in the prior art and is available, for example from the PQ Corporation of Valley Forge, PA. The other silicate added to this mixture at about 20% to about 0.10% to the total comprises 8.90% $Na_2O$ and 28.70% $SiO_2$, being about 37.6% solids and a viscosity of 180 Centipoises at 68° F. This material represents a weight ratio of $SiO_2$ to $Na_2O$ of 3.22 and is also easily manufactured as is well-known in the prior art and is available, for example from the PQ Corporation of Valley Forge, PA. These materials are conventional, syrupy-like liquids, highly soluble in water. What is surprising is that when these two particular silicates are blended in the ratios shown and mixed in the amounts given above, they are so effective in imparting the results shown and claimed in this invention when mixed with finely divided wood, cellulosic and fabric containing materials.

These wood, cellulosic and fabric containing materials may be made in to a myriad of building materials such as ceiling tiles, wall boards, insulation materials and the like. The ingredients of this invention can be added these finely materials during the manufacture of the building material itself, which is highly advantageous since the silicates of this invention can be dispersed within the fibrous material and thus can impart all of the advantages noted. This is a much better process than simply applying a fire retardant on the surface of finished building materials. The silicates of this invention are particularly useful when added to wood, cotton or other fibers. For example, in the manufacture of pressed wood elements into sheets and the like, I can dilute the silicate solution of this invention to about 10% solids and then pour this blend onto wood chips prior to their descent into a wood grinder. The silicate thoroughly coats the wood chips as they are being finely ground. All of these wood ingredients are made from waste products that can be garnered from dismantled buildings, fallen trees, roots, etc. Thus, any wood product made therefrom is highly useful since it can replace conventional wood products made from standing forests. On the other hand, I can add the silicate solution of this invention to waste fibers such as those taken from carpet ends and remnants or used carpets themselves. This is advantageous since it is difficult to dispose of waste carpet materials since they must be placed in a land fill.

In a particularly efficacious process within the practice of this invention, when it is required to make up a particularly advantageous solution for mixing with the finely divided wood, cellulosic and fabric containing materials, I prefer using the steps of preparing a mixture comprising:

a) from about 80% to about 99.1% by weight of a silicate comprising 14.70% $Na_2O$ and 29.40% $SiO_2$, being about 44.10% solids and a viscosity of 400 Centipoises at 68° F. and from about 20% to about 0.10% of a silicate comprising 8.90% $Na_2O$ and 28.70% $SiO_2$, being about 37.6% solids and a viscosity of 180 Centipoises at 68° F.;

b) further diluting the mixture from a), above, to about 10 to 30% solids;

c) adding from about 0.1% to about 3.0% of an alkali carbonate to b);

d) adding this mixture to the wood, cellulosic or fabric containing materials prior to grinding these materials into a finely divided state. When this process is practiced, the materials will mix extremely well with fibrous, cellulosic materials such as finely divided cardboard, cotton fibers, waste carpets and the like.

In an example of this process, there have been efforts to replace fiberglass insulation materials with those made from cotton fibers, since fiberglass can cause skin irritation to the handler and is suspect in the development of other irritations and even cancer. However, these cotton fiber materials are highly flammable and there has been a pressing need to make insulation bats from cotton fibers with increased fire resistance and essentially no handling hazard and which is not a demonstrated carcinogen. In the prior art, it has been found that boron compounds or sulfuric acid can be mixed with these fibers prior to making up as insulation fill or as insulation batting. However, these compounds do not impart sufficient fire proofing to permit there use in most construction. By making up a 20% aqueous solution of the silicates of this invention along with one pound of sodium bicarbonate per 30 gallons of solution (giving a 20% solids in solution), this solution can be added by spraying into a paddle wheel blender through spray heads in a standard carding machine containing cotton and some plastic fibers. This machine breaks down the fibers and thoroughly intermixes the plastic into the cotton along with the solution of silicates of this invention. A sort of "matte" like material results and this is then sent through and air entraining oven where the plastic melts and glues the cotton fibers together in a very soft, loose mat. The resulting product is soft, supple and highly insulative and environmentally safe, as it can be handled without gloves or glasses or special clothing. In addition, this material is highly resistant to fire surpassing all of the existing tests and far superior to any conventional, prior art fire retardants that can be added to this building material.

The material made as described above is formed into conventional insulating bats and tested for resistance to fire using ASTM Methods C739 and C665. In this particular test, the bats are brought ever closer to a flame and the point at which some degradation to fire occurs is marked as a distance from the flame. A standard, cotton fiber bat containing standard and conventional fire retardants, began to fail at 90 cm. The bats made according to this invention did not even begin to scorch until about 40–60 cm. from the flame, indicating that the resistance to fire was more than twice that of the bat which did not contain the materials of this invention. When fiberglass bats were used, the bat began to melt at the same distance and when the heat was this intense, the plasticizers present in the bat gave off noxious fumes. One of the materials used in the formation of fiberglass insulation bats is formaldehyde which, when in contact with high heat, yields poisonous cyanide gasses.

I claim:

1. A fire retardant solution for providing fire retardancy to finely divided wood, cellulosic and fabric containing materials when added thereto said solution comprising a mixture of silicates and water, wherein said mixture comprises a first and a second silicate, said first silicate added to the solution in an amount from about 80% to about 99.1% by weight and comprising a silicate comprising 14.70% $Na_2O$ and 29.40% $SiO_2$, being about 44.10% solids and a viscosity of 400 Centipoises at 68° F., and said second silicate added to the solution in an amount from about 20% to about 0.1% by weight and comprising a silicate comprising 8.90% $Na_2O$ and 28.70% $SiO_2$, being about 37.6% solids and a viscosity of 180 Centipoises at 68° F.

2. The fire retardant solution of claim 1 wherein said first silicate is added to the solution at 99.1% by weight and said second silicate at 0.10% by weight.

3. A process of imparting fire proofing to finely divided wood, cellulosic and fabric containing materials comprising preparing a mixture comprising:
   a) from about 80% to about 99.1% by weight of a first silicate comprising 14.70% $Na_2O$ and 29.40% $SiO_2$, being about 44.10% solids and a viscosity of 400 Centipoises at 68° F. and from about 20% to about 0.1% by weight of a second silicate two comprising 8.90% $Na_2O$ and 28.70% $SiO_2$, being about 37.6% solids and a viscosity of 180 Centipoises at 68° F.;
   b) diluting the mixture from a), above, to about 10 to 30% solids;
   c) adding about 0.2 pounds/gallon to about 1 pound/gallon of solution of an alkali carbonate to the diluted mixture of b);
   d) adding the resulting mixture of c) to wood, cellulosic and fabric containing materials prior to grinding said materials into a finely divided state.

4. The process of claim 3 wherein said first silicate is present at about 99.8% by weight of the solution and said second silicate is present at about 0.2% by weight of the solution.

5. The process of claim 4 where said alkali carbonate is sodium bicarbonate added at 1 pound/gallon of solution.

6. The process of claim 5 wherein said solution is diluted to 20% solids with water.

7. The process of claim 6 wherein said finely divided wood, cellulosic and fabric containing materials comprise waste wood products, cotton fibers or waste fibers from carpets.

* * * * *